(12) United States Patent
Nojiri et al.

(10) Patent No.: US 9,864,668 B2
(45) Date of Patent: Jan. 9, 2018

(54) APPARATUS, METHOD, AND SYSTEM FOR EVENT DATA PROCESSING

(71) Applicant: FUJITSU LIMITED, Kawasaki-shi, Kanagawa (JP)

(72) Inventors: Keita Nojiri, Kobe (JP); Taisuke Aizawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 473 days.

(21) Appl. No.: 14/471,023

(22) Filed: Aug. 28, 2014

(65) Prior Publication Data

US 2015/0095380 A1   Apr. 2, 2015

(30) Foreign Application Priority Data

Sep. 27, 2013 (JP) ................. 2013-202755

(51) Int. Cl.
*G06F 17/30* (2006.01)
*G06F 11/30* (2006.01)

(52) U.S. Cl.
CPC ...... *G06F 11/3072* (2013.01); *G06F 2201/86* (2013.01)

(58) Field of Classification Search
CPC ............. G06F 11/3072; G06F 11/1687; G06F 2201/86; G06F 17/30147
USPC .................................. 707/703, 803
See application file for complete search history.

(56) References Cited

U.S. PATENT DOCUMENTS

| 5,870,301 | A  | * | 2/1999 | Yakushiji | ............ | G06F 11/0757 700/3 |
| 2013/0182700 | A1 | * | 7/2013 | Figura | ..................... | H04L 43/08 370/352 |
| 2013/0226877 | A1 | * | 8/2013 | Nagai | ............... | G06F 17/30002 707/687 |

FOREIGN PATENT DOCUMENTS

| JP | 11-232124 | 8/1999 |
| JP | 2012-27577 | 2/2012 |

OTHER PUBLICATIONS

Patent Abstracts of Japan, Publication No. 11-232124, published Aug. 27, 1999.
Patent Abstracts of Japan, Publication No. 2012-027577, published Feb. 9, 2012.

* cited by examiner

*Primary Examiner* — Hares Jami
(74) *Attorney, Agent, or Firm* — Staas & Halsey LLP

(57) ABSTRACT

A data processing apparatus includes a processor that executes a procedure. The procedure includes: acquiring a plurality of events that have issued in a management-target device, storing each of the plurality of acquired events in an event storage unit, and acquiring specifying data that specify an important phenomenon key event from the plurality of events stored in the event storage unit; acquiring events in sequence from a front position of the event storage unit, and performing first processing on the acquired events according to a processing condition; performing second processing according to the processing condition on events of an important event group, the important event group including the important phenomenon key event and an event related to the important phenomenon key event; and appending completion information to the acquired important phenomenon key event in the event storage unit.

8 Claims, 12 Drawing Sheets

FIG.5

| ID | TIME OF ISSUING | RECEPTION TIME | EVENT SOURCE | MESSAGE | IMPORTANT PHENOMENON KEY EVENT FLAG | DEGREE OF IMPORTANCE |
|---|---|---|---|---|---|---|
| S001 | 2012/03/01 11:00 | - | MANAGEMENT-TARGET DEVICE A | MESSAGE O | - | - |
| S002 | 2012/03/01 11:01 | - | MANAGEMENT-TARGET DEVICE A | MESSAGE P | F001 | IMPORTANT |
| S003 | 2012/03/01 11:05 | - | MANAGEMENT-TARGET DEVICE B | MESSAGE Q | - | - |
| S004 | 2012/03/01 11:07 | - | MANAGEMENT-TARGET DEVICE B | MESSAGE R | F002 | MOST IMPORTANT |
| S005 | ... | ... | ... | ... | ... | ... |

FIG.6

| IMPORTANT PHENOMENON KEY EVENT SPECIFYING CONDITION ITEM | SPECIFYING ITEM VALUE |
|---|---|
| MESSAGE | MESSAGE P |
| EVENT SOURCE | MANAGEMENT-TARGET DEVICE A |
| EVENT ID | 5000 |
| ... | ... |
| ADDITIONAL DATA: DEGREE OF IMPORTANCE | IMPORTANT |
| ADDITIONAL DATA: RELATED EVENT INTERVAL OF ISSUING | 60 SECONDS |
| ADDITIONAL DATA: PROCESSING FILTER ID | F001 |

FIG.7

| ITEM | EXPLANATION | EXAMPLE |
|---|---|---|
| KEY EVENT SPECIFYING CONDITION | SPECIFIES CONDITION THAT SPECIFIES KEY EVENT | MESSAGE ITSELF, MASSAGE ID, ERROR DISCRIMINATOR, EVENT SOURCE HOST, ETC. |
| MONITORING METHOD | SPECIFIES MONITORING METHOD OF EVENT | MONITORING ONLY OF KEY EVENTS/ MONITORING NUMBER OF TIMES OF ISSUING / MONITORING KEY EVENT AND RELATED EVENTS, ETC. |
| NUMBER OF TIMES OF ISSUING | SET NUMBER OF TIMES OF ISSUING OF EVENT | 1 TIME/ 10 TIMES, ETC. |
| RELATED EVENT INTERVAL OF ISSUING | SETTING OF INTERVAL FROM KEY EVENT TO RELATED EVENT | 60 SECONDS/ 120 SECONDS, ETC. |
| RELATION OF RELATED EVENT | SETS MONITORING METHOD FOR PLURAL RELATED EVENTS | MONITOR PLURAL EVENTS WITH AND CONDITION/ MONITOR PLURAL EVENTS WITH OR CONDITION, ETC. |
| RELATED EVENT SPECIFYING CONDITION | SPECIFIES CONDITION TO DEFINE RELATED EVENTS | MESSAGE ITSELF, MASSAGE ID, ERROR DISCRIMINATOR, EVENT SOURCE HOST, ETC. |
| POST PROCESSING | DEFINES ACTION AFTER FILTER (POST PROCESSING) | CHANGE MESSAGE ITSELF/ EXECUTE PROGRAM/ GENERATE NEW MESSAGE, ETC. |

FIG.8

| ID | TIME OF ISSUING | RECEPTION TIME | EVENT SOURCE | MESSAGE | IMPORTANT PHENOMENON KEY EVENT FLAG | ACQUISITION COMPLETE FLAG |
|---|---|---|---|---|---|---|
| W001 | 2012/03/01 11:00 | 2012/03/01 11:00 | MANAGEMENT-TARGET DEVICE A | MESSAGE O | – | – |
| W002 | 2012/03/01 11:01 | 2012/03/01 11:01 | MANAGEMENT-TARGET DEVICE A | MESSAGE P | F001 | COMPLETE |
| W003 | 2012/03/01 11:05 | 2012/03/01 11:05 | MANAGEMENT-TARGET DEVICE B | MESSAGE Q | – | – |
| W004 | 2012/03/01 11:07 | 2012/03/01 11:07 | MANAGEMENT-TARGET DEVICE B | MESSAGE R | F002 | |
| W005 | ... | ... | ... | | ... | ... |

FIG.9

| ID | SPECIFYING DATA | DEGREE OF IMPORTANCE |
|---|---|---|
| E001 | W002 | IMPORTANT |
| E002 | W004 | MOST IMPORTANT |
| E003 | ... | ... |
| E004 | ... | ... |

APPARATUS, METHOD, AND SYSTEM FOR EVENT DATA PROCESSING

CROSS-REFERENCE TO RELATED APPLICATION

This application is based upon and claims the benefit of priority of the prior Japanese Patent Application No. 2013-202755, filed on Sep. 27, 2013, the entire contents of which are incorporated herein by reference.

FIELD

The embodiments discussed herein are related to a data processing apparatus, a data processing method, a recording medium storing a data processing program, and a data processing system.

BACKGROUND

Complex event processing exists as technology to perform sequential processing of events, collected from plural devices, according to predefined rules, and to sequentially extract or give notification of data required by a user. Such complex event processing technology may be applied, for example, to operation management programs that monitor phenomena occurring in a management-target device. In such cases, a phenomenon that has occurred in the management-target device is identified based on plural events collected from the management-target device, enabling processing according to the phenomenon to be performed, such as notifying the user.

In operation management programs that monitor occurrences of phenomena in management-target devices, sometimes the degree of importance differs depending on the phenomenon being monitored. There is a need for a mechanism in such cases to perform priority-wise processing for high importance phenomena, such as performing the processing of high importance phenomena immediately.

RELATED PATENT DOCUMENTS

Japanese Laid-Open Patent Publication No. 2012-27577
Japanese Laid-Open Patent Publication No. H11-232124

SUMMARY

According to an aspect of the embodiments, a non-transitory computer-readable medium having stored therein a data processing program that causes a computer to execute a process includes: acquiring plural events that have issued in a management-target device and storing each of the plural acquired events in an event storage unit, and acquiring specifying data that specify an important phenomenon key event from the plural events stored in the event storage unit; acquiring events in sequence from a front position of the event storage unit, and performing first processing on the acquired events according to a processing condition; performing second processing according to the processing condition events of an important event group, the important event group including the important phenomenon key event and event related to the important phenomenon key event; and appending completion information to the acquired important phenomenon key event in the event storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of events stored in a transmission event queue;
FIG. 6 is a diagram illustrating an example of important phenomenon key event specifying conditions;
FIG. 7 is a diagram to explain setting of processing filters;
FIG. 8 is a diagram illustrating an example of events stored in an events awaiting processing queue;
FIG. 9 is a diagram illustrating an example of an important phenomenon key event list.

DESCRIPTION OF EMBODIMENTS

Detailed explanation next follows regarding an example of an exemplary embodiment of technology disclosed herein, with reference to the drawings.

Requirements of Complex Event Processing

First, prior to detailed explanation of exemplary embodiments, explanation follows regarding requirements to be satisfied in complex event processing when processing to prioritize events of an event group indicating an important phenomenon.

In complex event processing, first detection is made for an event that specifies a phenomenon, and that is an event to act as a trigger for processing according to the phenomenon, namely an event (referred to below as "key event") that acts as a reference to indicate the phenomenon. Then to augment the key event, detection is made for event(s) (referred to below as "auxiliary events") that, together with the key event, indicate the same phenomenon. Events of an event group containing the detected key event and auxiliary events are then the subject of event processing. A first requirement for priority-wise processing is accordingly to collect together events of event group indicating an important phenomenon for which priority-wise processing is desired (referred to below as an "important event group").

Figure 1:
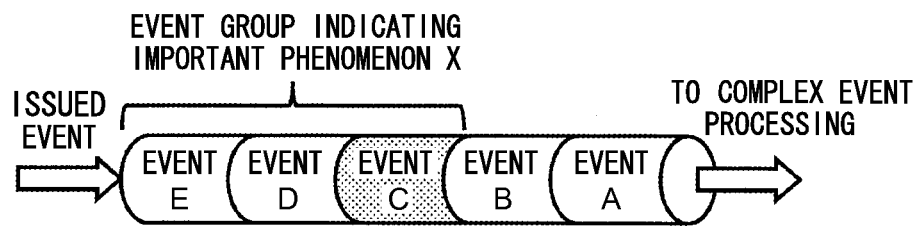
FIG. 1 is a schematic diagram to explain a requirement of complex event processing.

For example, as illustrated in FIG. 1, for events issuing in the sequence event A, event B, event C, event D, and event E, consider the case in which the key event for an important phenomenon X is the event C, and auxiliary events of the event C are event D and event E. In such a case the event C, the event D, and the event E need to be collectively subjected to priority-wise processing.

In complex event processing, an event for which priority-wise processing is performed, as a key event for an important phenomenon, is also sometimes an auxiliary event contained in an event group indicating another phenomenon. A second requirement is therefore to make an event that has been processed as a key event for an important phenomenon also utilizable in other event processing.

Figure 2:
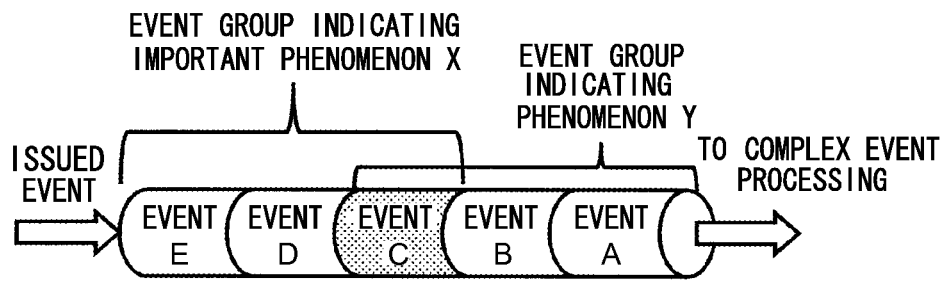
FIG. 2 is a schematic diagram to explain a requirement of complex event processing.

For example, as illustrated in FIG. 2, consider a case in which the event C is both a key event of important phenomenon X, and also an auxiliary event contained in an event group indicating phenomenon Y, a non-important phenomenon. In such cases, even if events of the important event group indicating the important phenomenon X are processed in priority, the event C still needs to be included in an event group subject to processing according to phenomenon Y.

Moreover, in complex event processing, sometimes processing is identified by the order of plural events. A third requirement is therefore not to disturb the ordering of events.

Figure 3:
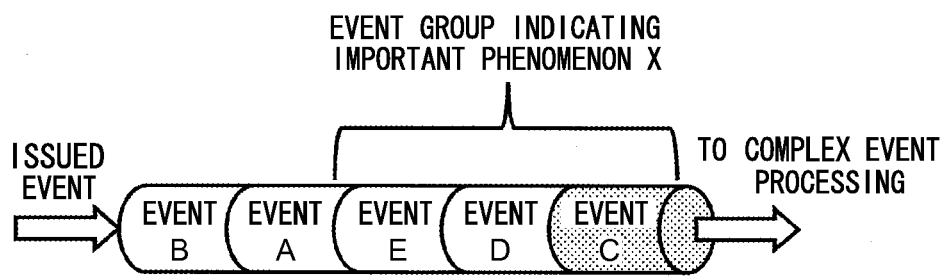
FIG. 3 is a schematic diagram to explain a requirement of complex event processing.

For example, in the example of FIG. 2, say the phenomenon Y is identified by the event C being after the event B. In such cases, there is a need to not disturb the ordering, event C being after event B, even in cases in which events of the important event group indicating the important phenomenon X are processed in priority. For example, as illustrated in FIG. 3, in cases in which events of the important event group indicating the important phenomenon X are moved to in front of the event group indicating the phenomenon Y in order to prioritize processing, the ordering of events is disturbed, and so phenomenon Y is no longer identifiable.

As described above, in complex event processing, there is a need to satisfy the above 3 requirements when prioritizing processing of events of an important event group indicating an important phenomenon.

Configuration of Data Processing System

Figure 4:
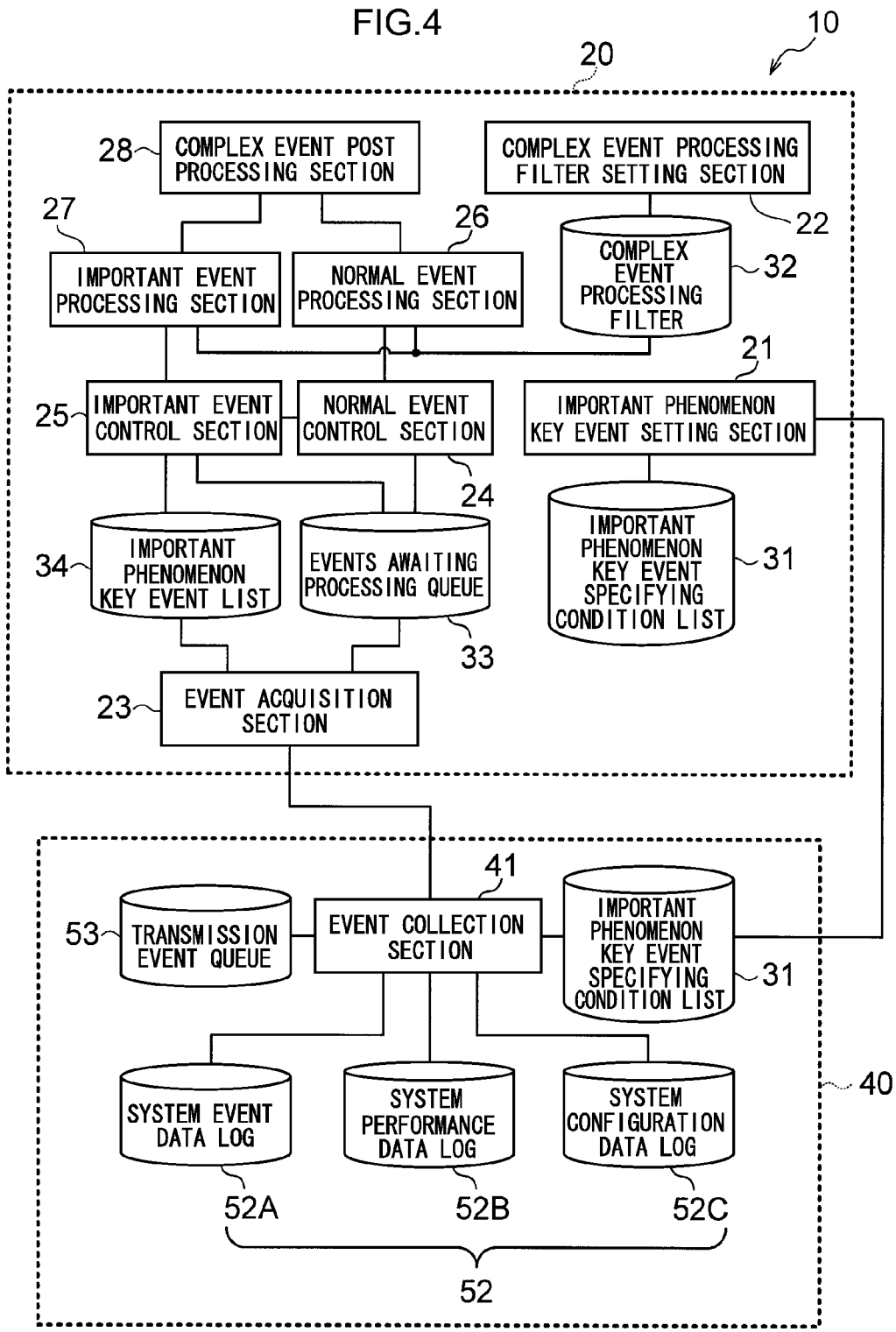
FIG. 4 is a block diagram illustrating a schematic configuration of a data processing system according to the present exemplary embodiment.

Explanation next follows regarding a configuration of a data processing system according to the present exemplary embodiment. As illustrated in FIG. 4, a data processing system 10 includes a data processing apparatus 20, and a management-target device 40. A single management-target device 40 is illustrated in the example of FIG. 4; however, plural management-target devices 40 may be included in the data processing system 10. In the data processing system 10, the data processing apparatus 20 acquires events that have issued in the management-target device 40, and, based on the acquired events, performs complex event processing according to phenomena that have occurred in the management-target device 40.

The management-target device 40, as illustrated in FIG. 4, includes an event collection section 41.

The event collection section 41 collects events that have newly arisen from various logs 52 indicating processing, operations, states, and the like, in the management-target device 40. In the example of FIG. 4, the various logs 52 include a system event data log 52A, a system performance data log 52B, and a system configuration data log 52C.

The event collection section 41 determines whether or not each of the collected events is an important phenomenon key event with reference to an important phenomenon key event specification condition list 31 (described in detail below) distributed from the data processing apparatus 20. The event collection section 41 sets an important phenomenon key event flag on an event determined to be important phenomenon key event, to indicate that that event is an important phenomenon key event. The event collection section 41 refers to the important phenomenon key event specification condition list 31 (described in detail below), and allocates a degree of importance of the important phenomenon indicated by the important phenomenon key event, to any event determined to be an important phenomenon key event.

The event collection section 41 stores collected events in a serial transmission event queue 53. An example of events stored in the transmission event queue 53 is illustrated in FIG. 5. In the example in FIG. 5, one record indicates one event, and each of the events is allocated an ID that specifies the event stored in the transmission event queue 53. Each of the events stored in the transmission event queue 53 includes data of a time of issuing, an event source, a message, an important phenomenon key event flag, and a degree of importance. The time of issuing is the time when the event issued in the management-target device 40, the event source is data specifying the management-target device 40 in which the event issued, and the message is data indicating the contents of the event that issued. A processing filter ID is also allocated here, as the phenomenon key event flag that specifies the processing filter (described in detail below) applied during processing of events of an important event group containing the important phenomenon key event.

The event collection section 41 transmits the events stored in the transmission event queue 53 to the data processing apparatus 20, from the front position.

The data processing apparatus 20, as illustrated in FIG. 4, includes an important phenomenon key event setting section 21 and a complex event processing filter setting section 22. The data processing apparatus 20 includes an event acquisition section 23, a normal event control section 24, an important event control section 25, a normal event processing section 26, an important event processing section 27, and a complex event post processing section 28. The event acquisition section 23 is an example of an acquisition section of technology disclosed herein. The normal event control section 24 and the normal event processing section 26 are an example of a first processing section of technology disclosed herein. The important event control section 25 and the important event processing section 27 are an example of a second processing section of technology disclosed herein.

The important phenomenon key event setting section 21 sets important phenomenon key event specifying conditions that are conditions that specify important phenomenon key events from events issuing in the management-target device 40. The important phenomenon key event specifying conditions may be determined by using data included in the event, such as the message, event source, or event ID. The event ID is data allocated by the management-target device 40 that specify the type of event. FIG. 6 illustrates an example of important phenomenon key event specifying conditions. The example in FIG. 6 illustrates conditions that specify an event as an important phenomenon key event of: message included in event is "message P", event source is "management-target device A", event ID is "5000", and so on.

The important phenomenon key event specifying conditions include, as additional data, data of a degree of importance, a related event interval of issuing, and a processing filter ID. The degree of importance is a level indicating how important the important phenomenon indicated by the important phenomenon key event is, namely the degree of priority that should be given to processing. For example, the degree of importance may be set with levels of two grades: "most important" and "important", or may be set with 3 or more levels, such as, in sequence from the highest level, degree of importance 1, degree of importance 2, degree of importance 3, and so on. The related event interval of issuing is data to determine the size of interval, after issuing of an important phenomenon key event, in which events issuing are classified as related events of the important phenomenon key event. "Related event" is an event that is a candidate for an auxiliary event to the important phenomenon key event, and is an event that satisfies fixed conditions (such as, for example, the interval of issuing to the important phenomenon key event being a specific duration or less).

The important phenomenon key event specifying conditions are input by a user through an input-output device, such as a mouse, keyboard, display, or the like, not illustrated in the drawings. The important phenomenon key event setting section 21 receives the input important phenomenon key event specifying conditions, and collects together plural important phenomenon key event specifying conditions and saves them in a specific storage region as the important phenomenon key event specification condition list 31. The important phenomenon key event setting section 21 distributes the important phenomenon key event specification condition list 31 to the management-target device 40.

The complex event processing filter setting section 22, as illustrated in FIG. 7, based on specifying methods for key events and for related events, and on processing methods for events of specified event groups, sets processing filters that specify an event group and determine the contents of processing for events of the specified event group. The processing filters are input by a user through an input-output device, such as a mouse, keyboard, or display, not illustrated in the drawings. The complex event processing filter setting section 22 receives input processing filters, and saves the plural processing filters as a complex event processing filter 32 in a specific storage region.

The event acquisition section 23 acquires plural events that have arisen in the management-target device 40, and stores each of the plural acquired events in an events awaiting processing queue 33. FIG. 8 illustrates an example of events stored in the events awaiting processing queue 33. In the example of FIG. 8, one record indicates a single event, and each of the events is allocated an ID that specifies the events stored in the events awaiting processing queue 33. Each of the events stored in the events awaiting processing queue 33 includes data of a time of arising, a reception time, an event source, a message, an important phenomenon key event flag, and an acquisition complete flag. The reception time is the time the event was acquired by the data processing apparatus 20. The acquisition complete flag is a flag set for events already acquired by the important event control section 25, for processing by the important event processing section 27, described below.

The event acquisition section 23 acquires specifying data that specify which of the events, from plural events stored in the events awaiting processing queue 33, is an important phenomenon key event. The acquired specifying data is then recorded in an important phenomenon key event list 34, together with the degree of importance allocated to the important phenomenon key event. FIG. 9 illustrates an example of an important phenomenon key event list 34. In the example illustrated in FIG. 9, the specifying data is the ID in the events awaiting processing queue 33. Specifying data other than the ID may be employed, such as the address where the important phenomenon key event is stored.

The normal event control section 24 acquires the event from the front of the events awaiting processing queue 33, and passes the acquired event across to the normal event processing section 26.

The normal event control section 24 passes the important phenomenon key event across to the normal event processing section 26 even in cases in which the event stored at the front of the events awaiting processing queue 33 is an important phenomenon key event not set with an acquisition complete flag. The normal event control section 24 then notifies the important event control section 25 that the important phenomenon key event has been passed across to the normal event processing section 26. In the notification to the important event control section 25, the normal event control section 24 includes specifying data of the important phenomenon key event passed across to the normal event processing section 26, and data of the time difference between the reception time of the important phenomenon key event and the current time.

The normal event control section 24 removes the event passed across to the normal event processing section 26 from the events awaiting processing queue 33.

The important event control section 25 acquires specifying data of an important phenomenon key event that has the degree of importance to become the processing subject, from the front of the important phenomenon key event list 34. For example, in the example of the important phenomenon key event list 34 illustrated in FIG. 9, explanation follows regarding a case in which the level of degree of importance has two grades, "most important" and "important". All of the specifying data recorded in the important phenomenon key event list 34 is applicable if the degree of importance to become the processing subject is set at "important" or higher, and so the specifying data at the front of the important phenomenon key event list 34 ("W002" in the example illustrated in FIG. 9) is acquired. However, if the degree of importance to become the processing subject is "most important", then, from out of the specifying data recorded in the important phenomenon key event list 34, the specifying data of the first item having a degree of importance of "most important" ("W004" in the example illustrated in FIG. 9) is acquired. The important event control section 25 removes the record related to the acquired specifying data from the important phenomenon key event list 34.

The important event control section 25 acquires from the events awaiting processing queue 33 the important phenomenon key event specified by the acquired specifying data. The important event control section 25 then sets an acquisition complete flag on the acquired important phenomenon key event in the events awaiting processing queue 33.

The important event control section 25 also acquires from the events awaiting processing queue 33 related events that have issued within a fixed period of time from the time of issuing of the acquired important phenomenon key event. Specifically, the important event control section 25 references the complex event processing filter 32, and acquires a related event interval of issuing defined in the processing filter indicated by the processing filter ID set as the important phenomenon key event flag on the acquired important phenomenon key event. The important event control section 25 then acquires from the events awaiting processing queue 33 any events having a time of issuing with an interval to the time of issuing of the acquired important phenomenon key event within the acquired related event interval of issuing. The important event control section 25 passes the important event group, including the acquired important phenomenon key event and related events, across to the important event processing section 27.

After receiving notification that the important phenomenon key events have been passed across from the normal event control section 24 to the normal event processing section 26, the important event control section 25 removes the records related to the specifying data included in the notification from the important phenomenon key event list 34.

The important event control section 25 also compares the time difference included in the notification from the normal event control section 24 against a predetermined threshold value. In cases in which there is a large time difference included in the notification, it is conceivable that there is congestion in processing by the important event processing section 27 of events of event groups indicated as important phenomena. The important event control section 25 accordingly raises the level of the degree of importance to become the processing subject if the time difference is greater than the predetermined threshold value. This thereby enables setting such that events of only the more important of the important event groups are processed in priority by the important event processing section 27. The important event control section 25 saves the data of the changed level of the degree of importance to become the processing subject in a specific storage region.

The important event control section 25 lowers the saved level of the degree of importance if specifying data with the priority to become the processing subject is no longer present in the important phenomenon key event list 34, and re-saves the level in the specific storage region. For example, in cases in which the level of the degree of importance to become the processing subject has been raised from "important" to "most important", the degree of importance is returned to "important" if there are no longer records with "most important" present in the important phenomenon key event list 34.

The normal event processing section 26 applies each of the processing filters included in the complex event processing filter 32 and performs complex event processing on the event passed across from the normal event control section 24. Explanation follows regarding a more specific example of processing. The normal event processing section 26 determines whether the event passed across from the normal event control section 24 corresponds to a key event as defined by any of the processing filters. If the passed across event corresponds to a key event, then any related events that match conditions defined in the corresponding processing filter are acquired from the events awaiting processing queue 33. Processing is then performed on the event group containing the acquired key event and the related events, such as determining the condition defined in the corresponding processing filter. If determined that some sort of post processing is required according to a phenomenon indicated by the event group, the contents of such post processing is appended to the key event, and then the key event is passed across to the complex event post processing section 28.

If an acquisition complete flag has been set to the event passed across from the normal event control section 24, this event is treated as an important phenomenon key event, and the complex event processing for an important phenomenon is performed in the important event processing section 27. In order to remove duplication of processing, for events set with an acquisition complete flag, the normal event processing section 26 does not perform complex event processing that has been applied with a processing filter indicated by a processing filter ID set as an important phenomenon key event flag.

For events of an important event group passed across from the important event control section 25, the important event processing section 27 performs complex event processing applied with a processing filter indicated by a processing filter ID set as an important phenomenon key event flag. The processing of the important event processing section 27 is performed in parallel to the normal event processing section 26, via a different route to that of the normal event processing section 26. Processing is accordingly prioritized for events of important event groups.

The complex event post processing section 28 executes post processing according to the contents of post processing appended to each of the events passed across from the normal event processing section 26 and the important event processing section 27. The post processing is, for example, sending an e-mail, displaying a message on a display, executing another program, or the like.

Figure 10:
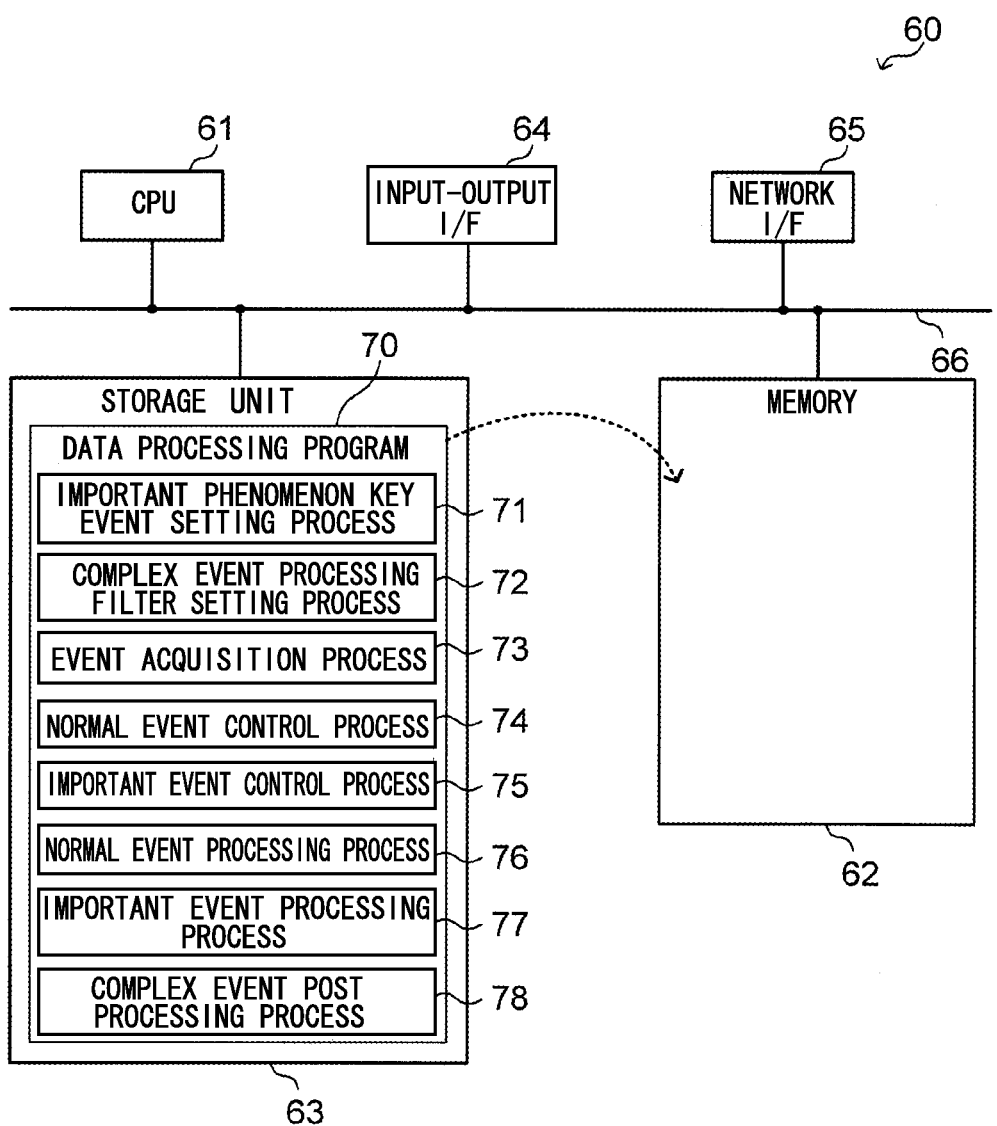
FIG. 10 is a schematic block diagram illustrating an example of a computer functioning as a data processing apparatus.

The data processing apparatus 20 may be implemented by a computer 60 as illustrated in, for example, FIG. 10. The computer 60 includes a CPU 61, a memory 62, a non-volatile storage section 63, an input-output interface I/F 64, and a network I/F 65. The CPU 61, the memory 62, the storage section 63, the input-output I/F 64, and the network I/F 65 are connected together through a bus 66.

The storage section 63 may be implemented by a Hard Disk Drive (HDD), flash memory, or the like. A data processing program 70 for causing the computer 60 to function as the data processing apparatus 20 is stored in the storage section 63, serving as a recording medium. The CPU 61 reads the data processing program 70 from the storage section 63, expands the data processing program 70 in the memory 62, and sequentially executes the processes in the data processing program 70.

The data processing program 70 includes an important phenomenon key event setting process 71, and a complex event processing filter setting process 72. The data processing program 70 also includes an event acquisition process 73, a normal event control process 74, an important event control process 75, a normal event processing process 76, an important event processing process 77, and a complex event post processing process 78.

The CPU 61 operates as the important phenomenon key event setting section 21 illustrated in FIG. 4 by executing the important phenomenon key event setting process 71. The CPU 61 operates as the complex event processing filter setting section 22 illustrated in FIG. 4 by executing the complex event processing filter setting process 72. The CPU 61 operates as the event acquisition section 23 illustrated in FIG. 4 by executing the event acquisition process 73. The CPU 61 operates as the normal event control section 24 illustrated in FIG. 4 by executing the normal event control process 74. The CPU 61 operates as the important event control section 25 illustrated in FIG. 4 by executing the important event control process 75. The CPU 61 operates as the normal event processing section 26 illustrated in FIG. 4 by executing the normal event processing process 76. The CPU 61 operates as the important event processing section 27 illustrated in FIG. 4 by executing the important event processing process 77. The CPU 61 operates as the complex event post processing section 28 illustrated in FIG. 4 by executing the complex event post processing process 78.

The computer 60 in which the data processing program 70 is executed accordingly functions as the data processing apparatus 20.

The data processing apparatus 20 may be implemented with, for example, a semiconductor integrated circuit, and more specifically with an Application Specific Integrated Circuit (ASIC) or the like.

The management-target device 40 may also be configured by a computer that includes a CPU, a memory, a non-volatile storage unit, an input-output I/F, and the network I/F. The management-target device 40 may be implemented with, for example, a semiconductor integrated circuit, and more specifically with an ASIC, or the like Explanation next follows regarding operation of the data processing system 10 according to the present exemplary embodiment. The management-target device 40 transmits events that have issued in the management-target device 40 to the data processing apparatus 20 by executing the management-target device-side processing illustrated in FIG. 11. The data processing apparatus executes complex event processing including priority-wise processing of events of an important event group by executing the data processing apparatus-side processing illustrated in FIG. 13. Detailed explanation follows regarding each process.

Figure 11:
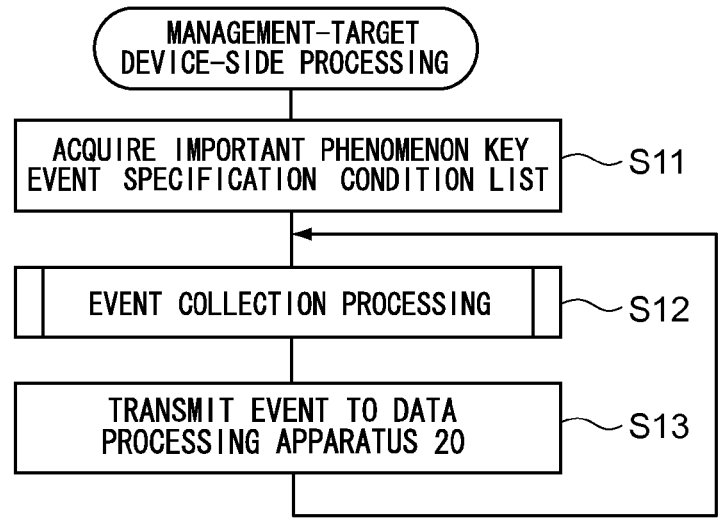
FIG. 11 is a flow chart illustrating management-target device-side processing.

At step S11 of the management-target device-side processing illustrated in FIG. 11, the event collection section 41 acquires the important phenomenon key event specification condition list 31 distributed from the data processing apparatus 20, and saves the important phenomenon key event specification condition list 31 in a specific storage region. The important phenomenon key event specification condition list 31 is distributed to each of the management-target devices 40 by the important phenomenon key event setting section 21 executing important phenomenon key event setting process, described below.

Figure 12:
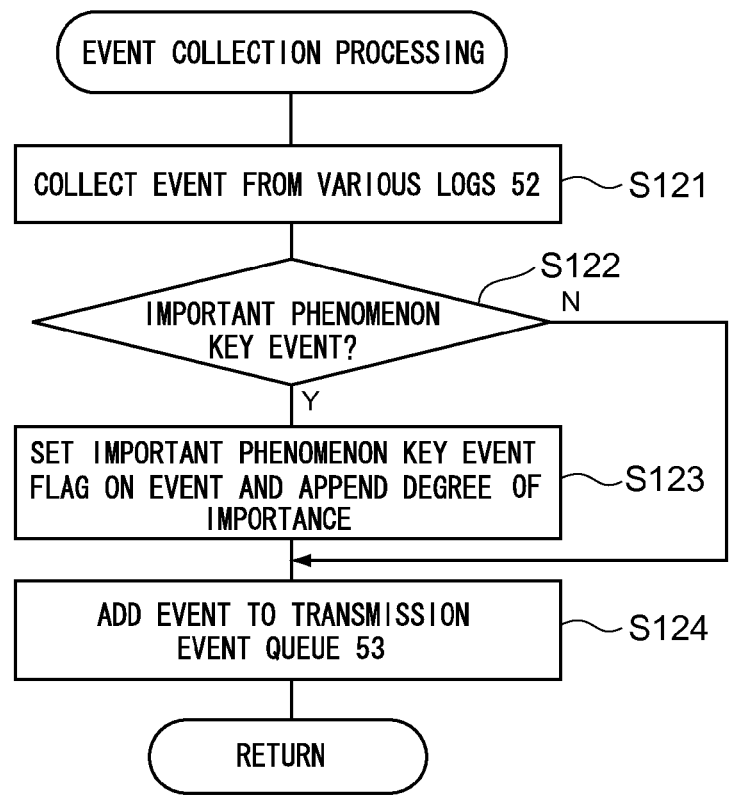
FIG. 12 is a flow chart illustrating event collection processing.

Then, at step S12, the event collection section 41 executes the event collection processing illustrated in FIG. 12.

At step S121 of the event collection processing illustrated in FIG. 12, the event collection section 41 collects together new events that have issued from the various logs 52. Then, at step S122, the event collection section 41 references the important phenomenon key event specification condition list 31, and determines whether or not each of the collected events is an important phenomenon key event. Processing transitions to step S123 for an important phenomenon key event, and, skipping the processing of step S123, processing transitions to step S124 for a non-important phenomenon key event.

At step S123, the event collection section 41 sets an important phenomenon key event flag to the event determined to be an important phenomenon key event, refers to the important phenomenon key event specification condition list 31, and appends the degree of importance of the important phenomenon indicated by that important phenomenon key event.

Then, at step S124, the event collection section 41 stores the collected event in the serial transmission event queue 53, and returns to the management-target device-side processing.

Then, at step S13 of the management-target device-side processing, the event collection section 41 transmits the events stored in the transmission event queue 53 to the data processing apparatus 20, from the front position, and then returns to step S12.

The processing of step S12 is executed in parallel with the processing of step S13. Thus even if, at step S12, the event collection section 41 adds an event to the transmission event queue 53, the event collection section 41 continues with the processing of step S12, and starts the processing of step S13.

Figure 13:
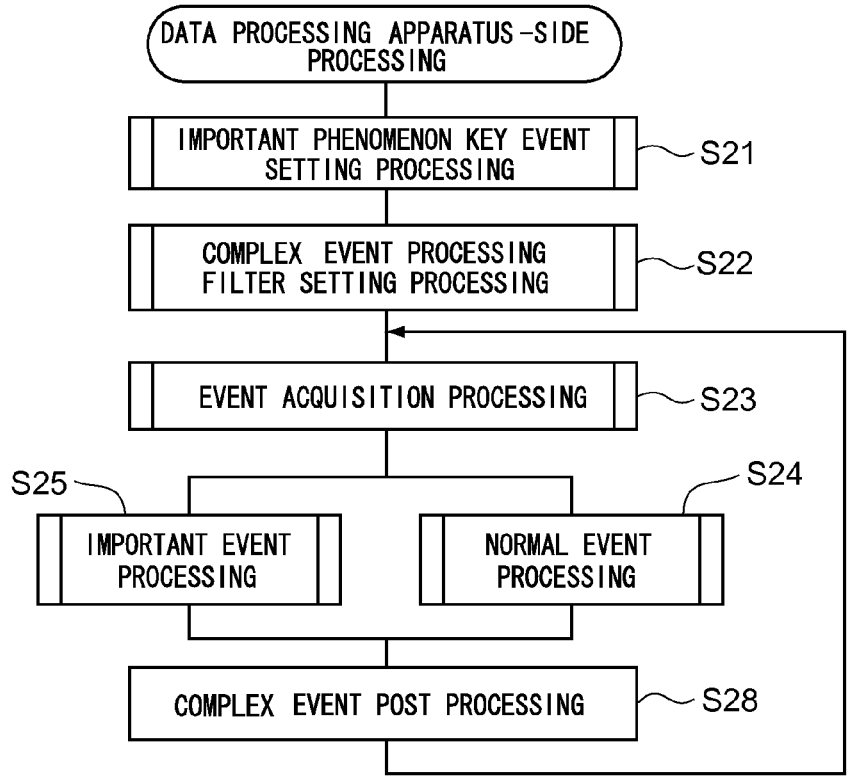
FIG. 13 is a flow chart illustrating data processing apparatus-side processing.
Figure 14:
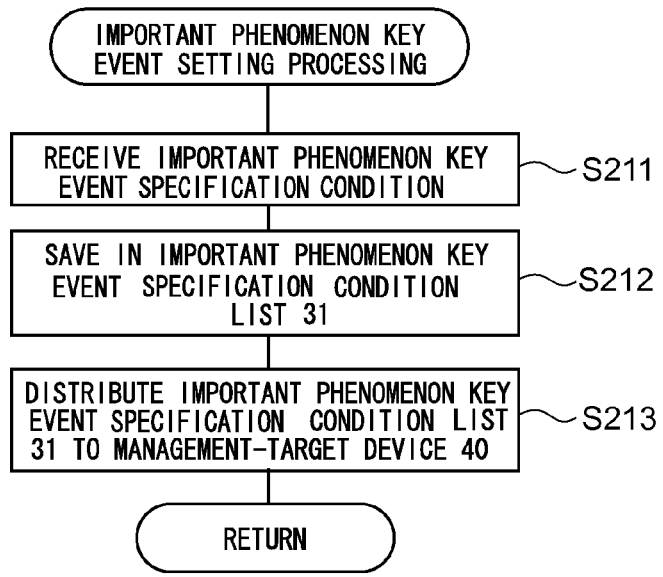
FIG. 14 is a flow chart illustrating important phenomenon key event setting processing.

Then, at step S21 of the data processing apparatus-side processing illustrated in FIG. 13, the important phenomenon key event setting section 21 executes the important phenomenon key event setting process illustrated in FIG. 14.

At step S211 of the important phenomenon key event setting process illustrated in FIG. 14, the important phenomenon key event setting section 21 receives an important phenomenon key event specifying condition input by a user through an input-output device, such as a mouse, keyboard, or display, not illustrated in the drawings.

Then, at step S212, the important phenomenon key event setting section 21 saves the important phenomenon key event specification condition list 31, in which plural important phenomenon key event specifying conditions have been collected together, in a specific storage region. Then, at step S213, the important phenomenon key event setting section 21 distributes the important phenomenon key event specification condition list 31 to the management-target device 40, and then returns to the data processing apparatus-side processing.

Figure 15:
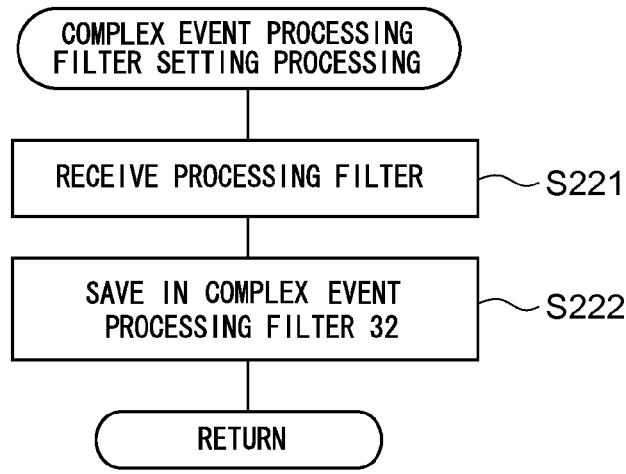
FIG. 15 is a flow chart illustrating complex event processing filter setting processing.

Then, at step S22 of the data processing apparatus-side processing illustrated in FIG. 13, the complex event processing filter setting section 22 executes the complex event processing filter setting processing illustrated in FIG. 15.

At step S221 in the complex event processing filter setting processing illustrated in FIG. 15, the complex event processing filter setting section 22 receives a processing filter input by a user through an input-output device, such as a mouse, keyboard, or display, not illustrated in the drawings. Then, at step S222, the complex event processing filter setting section 22 saves the complex event processing filter 32, in which plural processing filters are collected together, in a specific storage region, and then returns to the data processing apparatus-side processing.

Figure 16:
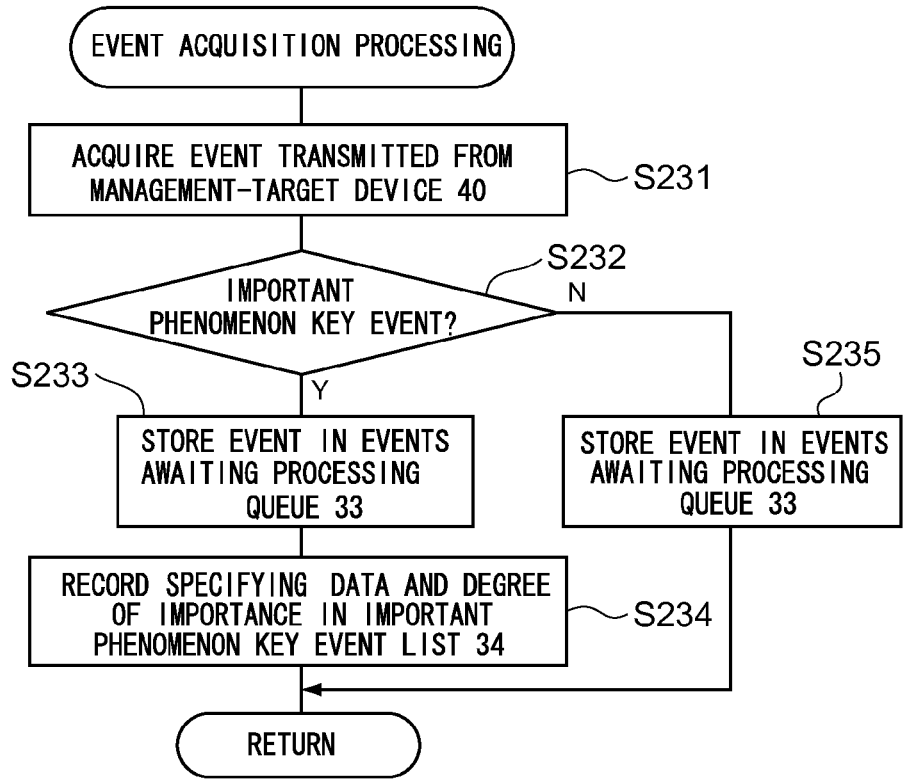
FIG. 16 is a flow chart illustrating event acquisition processing.

Then, at step S23 of the data processing apparatus-side processing illustrated in FIG. 13, the event acquisition section 23 executes the event acquisition processing illustrated in FIG. 16.

At step S231 of the event acquisition processing illustrated in FIG. 16, the event acquisition section 23 acquires an event transmitted from the management-target device 40.

Then, at step S232, the event acquisition section 23 references the important phenomenon key event flag, and determines whether or not the acquired event is an important phenomenon key event. Processing proceeds to step S233 for an important phenomenon key event, and processing transitions to step S235 for a non-important phenomenon key event.

At step S233, the event acquisition section 23 stores the acquired event in the events awaiting processing queue 33. Then, at step S234, out of the plural events stored in the events awaiting processing queue 33, the event acquisition section 23 acquires specifying data that specifies which event is an important phenomenon key event. For example, IDs in the events awaiting processing queue 33 of the events determined to be important phenomenon key events are acquired as the specifying data. The event acquisition section 23 then records the acquired specifying data, together with the degree of importance appended to the important phenomenon key events, in the important phenomenon key event list 34, and returns to the data processing apparatus-side processing.

At step S235, similarly to at step S233, the event acquisition section 23 performs only processing to store the acquired event in the events awaiting processing queue 33, and returns to the data processing apparatus-side processing.

Figure 17:
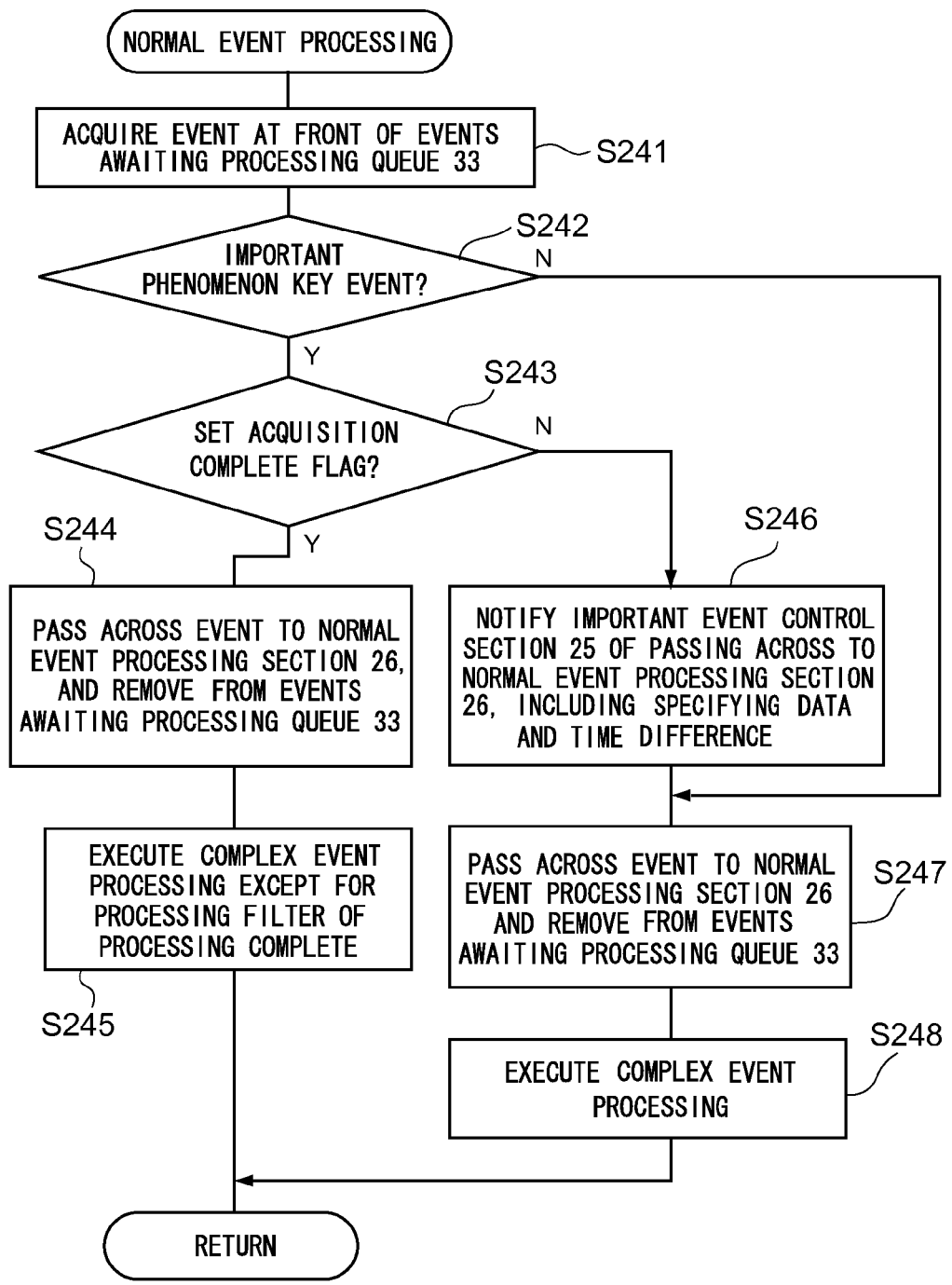
FIG. 17 is a flow chart illustrating normal event processing.

Then, at step S24 of the data processing apparatus-side processing illustrated in FIG. 13, the normal event control section 24 and the normal event processing section 26 execute the normal event processing illustrated in FIG. 17.

At step S241 of the normal event processing illustrated at step 17, the normal event control section 24 acquires the event from the front of the events awaiting processing queue 33.

Then, at step S242, the normal event control section 24 determines whether or not the acquired event is an important phenomenon key event. Processing proceeds to step S243 for an important phenomenon key event, and processing transitions to step S247 for a non-important phenomenon key event.

At step S243, the normal event control section 24 determines whether or not an acquisition complete flag is set to the acquired event. Processing transitions to step S244 if an acquisition complete flag is set, and processing transitions to step S246 if there is no acquisition complete flag set.

At step S244, the normal event control section 24 passes the acquired event across to the normal event processing section 26. The normal event control section 24 then removes the event passed across from the normal event processing section 26 from the events awaiting processing queue 33.

Then, at step S245, the normal event processing section 26 applies each of the processing filters contained in the complex event processing filter 32 to the event passed across from the normal event control section 24, performs complex event processing, and then returns to the data processing apparatus-side processing. When this is performed, the normal event processing section 26 does not perform any complex event processing applied with a processing filter indicating a processing filter ID set as an important phenomenon key event flag.

At step S246, the normal event control section 24 acquires specifying data of the acquired event (for example, the ID in the events awaiting processing queue 33). The normal event control section 24 computes the time difference between the reception time of acquired event and the current time. The normal event control section 24 then notifies the important event control section 25 that the important phenomenon key event has been passed across to the normal event processing section 26, including the specifying data and the time difference.

Then, at step S247, the normal event control section 24 passes the acquired event to the normal event processing section 26. The normal event control section 24 then removes the event that has been passed across from the normal event processing section 26 from the events awaiting processing queue 33.

Then, at step S248, the normal event processing section 26 applies each of the processing filters included in the complex event processing filter 32 to the event passed across from the normal event control section 24, performs complex event processing thereon, and then returns to the data processing apparatus-side processing.

Figure 18:
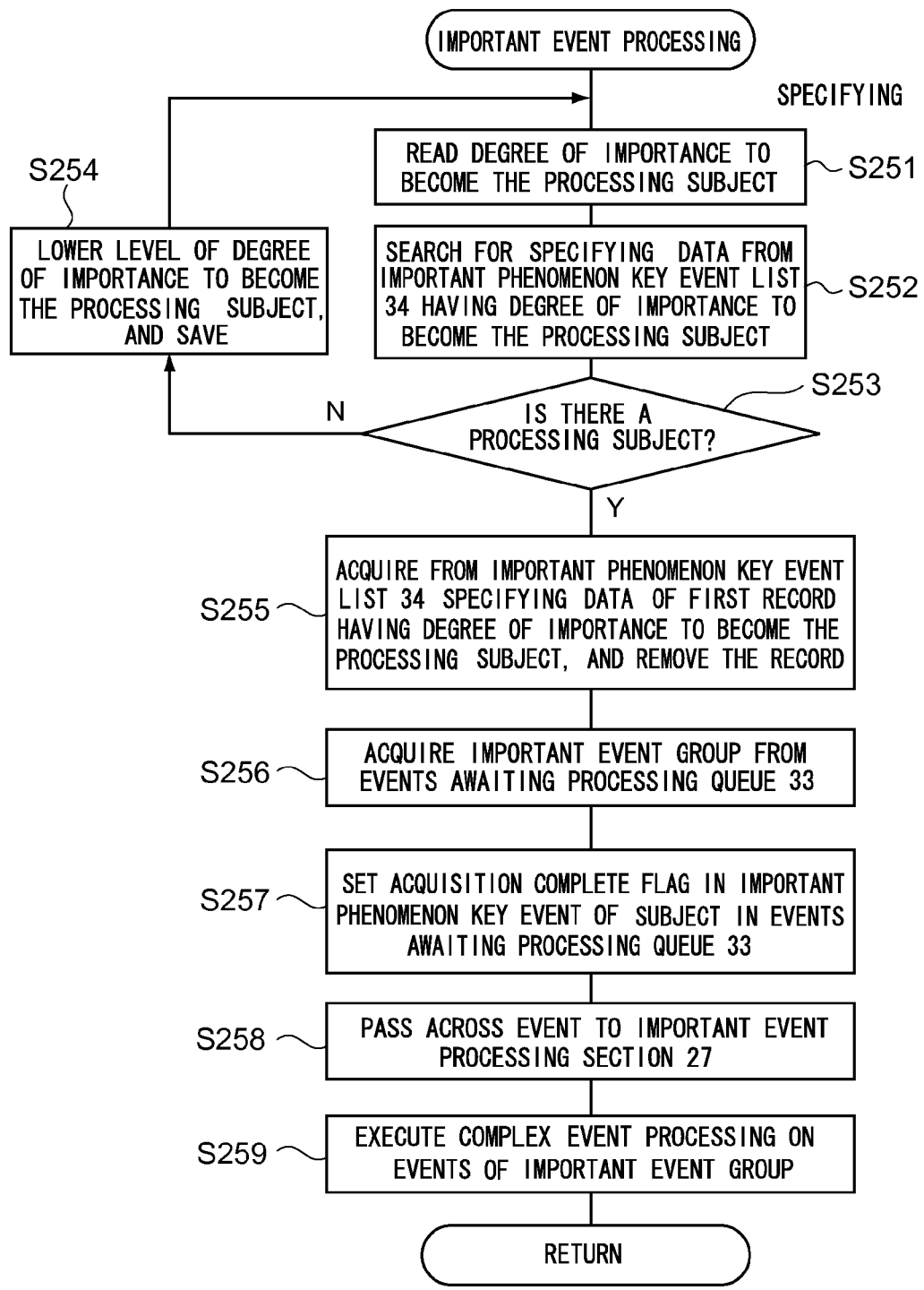
FIG. 18 is a flow chart illustrating important event processing.

Then, at step S25 of the data processing apparatus-side processing illustrated in FIG. 13, the important event control section 25 and the important event processing section 27 execute the important event processing illustrated in FIG. 18.

At step S251 of the important event processing illustrated in FIG. 18, the important event control section 25 reads in the degree of importance to become the processing subject held in the specific storage region.

Then, at step S252, the important event control section 25 searches, from the front of the important phenomenon key event list 34, for specifying data of an important phenomenon key event having the degree of importance to become the processing subject.

Then, at step S253, the important event control section 25 determines whether or not there is specifying data present having the degree of importance to become the processing subject. Processing proceeds to step S255 if present, and processing transitions to step S254 if not present.

At step S254, the important event control section 25 lowers the saved level of the degree of importance to become the processing subject, and then re-saves the level in a specific storage region, and returns to step S251.

At step S255, out of the specifying data recorded in the important phenomenon key event list 34, the important event control section 25 acquires, from the front, the specifying data having the degree of importance to become the processing subject. The important event control section 25 also removes the record relating to the acquired data from the important phenomenon key event list 34.

Then, at step S256, the important event control section 25 acquires an important phenomenon key event specified by the acquired specifying data from the events awaiting processing queue 33. The important event control section 25 also acquires, from the events awaiting processing queue 33, any related events that arose within a fixed time interval from the time of issuing of the acquired important phenomenon key event.

Then, at step S257, the important event control section 25 sets an acquisition complete flag in the events awaiting processing queue 33 to the acquired important phenomenon key event.

Then, at step S258, the important event control section 25 passes across an important event group containing the acquired important phenomenon key event and any related events to the important event processing section 27.

Then, at step S259, the important event processing section 27 performs, for events of the important event group passed across from the important event control section 25, complex event processing applied with the processing filter indicated by the processing filter ID set as the important phenomenon key event flag. Processing then returns to the data processing apparatus-side processing.

Then, at step S28 of the data processing apparatus-side processing illustrated in FIG. 13, the complex event post processing section 28 executes post processing according to the contents of post processing appended to the event passed across from the normal event processing section 26 and from the important event processing section 27, and processing then returns to step S23.

Figure 19:
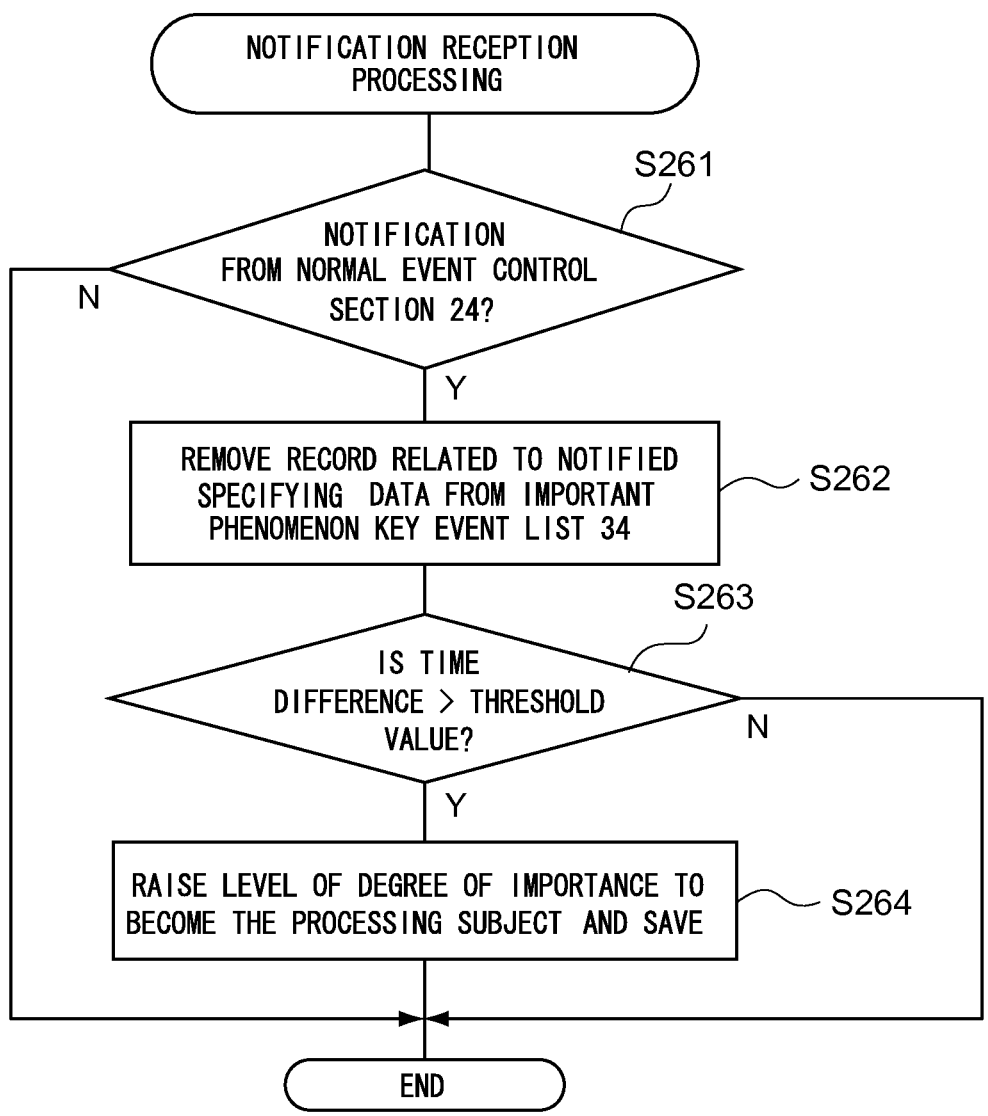
FIG. 19 is a flow chart illustrating notification reception processing.

The important event control section 25 executes notification reception processing illustrated in FIG. 19 in parallel to the important event processing illustrated in FIG. 18.

At step S261 of the notification reception processing illustrated in FIG. 19, the important event control section 25 determines whether or not notification has been received from the normal event control section 24 that an important phenomenon key event has been passed across to the normal event processing section 26. Processing transitions to step S261 if notification has been received, and the notification reception processing is ended if no notification has been received.

At step S262, the important event control section 25 removes the record relating to the specifying data included in the received notification from the important phenomenon key event list 34.

Then, at step S263, the important event control section 25 determines whether or not the time difference included in the received notification is greater than a predetermined threshold value. If the time difference>threshold value, the important event control section 25 raises the saved level of the degree of importance to become the processing subject, and re-saves the level again in the specific storage region, and ends the notification reception processing. If the time difference≤threshold value, the notification reception processing is ended without changing the saved level of the degree of importance to become the processing subject.

The processing of step S23 is executed in parallel with the processing of step 24 and step 25. Thus at step S23, the event acquisition section 23 adds an event to the events awaiting processing queue 33. Then, with the event acquisition section 23 continuing with the processing of step S23, the processing of step S24 is started by the normal event control section 24 and the normal event processing section 26. In parallel thereto, the event acquisition section 23 adds data relating to the specifying data of the important phenomenon key event to the important phenomenon key event list 34. Then, while the event acquisition section 23 continues with the processing of step S23, the processing of step S25 is started by the important event control section 25 and the important event processing section 27.

As described above, according to the data processing apparatus according to the present exemplary embodiment, the important event group including the important phenomenon key event and any related events being collected together and passed across to an important event processing section that is different from the normal event processing section, enabling events of an important event group to be collectively priority processed. For important phenomenon key events that are processed in priority, managing by setting a flag and not by removing from the events awaiting processing queue, enables an event processed as a key event for an important phenomenon to also be utilizable in separate event processing. The sequence of events is also not disturbed.

Thus priority-wise processing of events indicating important phenomenon is enabled, while still satisfying requirements of complex event processing.

In the above exemplary embodiment, although explanation has been given of an example in which the important phenomenon key event specification condition list 31 is referenced in the event collection section 41 of the management-target device 40, and determination is made as to whether or not the collected events are important phenomenon key events; however, there is no limitation thereto. The important phenomenon key event specification condition list 31 may be referenced in the event acquisition section 23 of the data processing apparatus 20, so as to determine whether or not the event acquired from the management-target device 40 is an important phenomenon key event. However, as in the present exemplary embodiment, determining whether or not the collected events in the event collection section 41 of each of the management-target devices 40 is an important phenomenon key event enables processing load to be distributed, enabling the processing load on the data processing apparatus 20 to be reduced.

Although explanation has been given above of a mode in which the data processing program 70 is pre-stored (installed) on the storage section 63, data processing program 70 may be provided in a format stored on a recording medium, such as a CD-ROM or a DVD-ROM.

An aspect of technology disclosed herein has the advantageous effect of enabling priority-wise processing to be performed on an event indicated as being an important phenomenon, while still satisfying requirements of the complex event processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable medium having stored therein a data processing program that causes a computer to execute a process comprising:
   acquiring a plurality of events that have issued in a management-target device and storing each of the plurality of acquired events in an event storage unit;
   acquiring specifying data that specify an important phenomenon key event from the plurality of events stored in the event storage unit;
   acquiring events in sequence from a front position of the event storage unit, and performing first processing on the acquired events according to a processing condition;
   performing second processing according to the processing condition on events of an important event group, the important event group including the important phenomenon key event and an event related to the important phenomenon key event, the second processing being performed concurrently with the first processing, via a different processing route from that of the first processing; and
   appending completion information to the acquired important phenomenon key event in the event storage unit, wherein
   in the first processing, if an event stored at the front position of the event storage unit is an important phenomenon key event not appended with completion information, events of an important event group including the important phenomenon key event not appended with the completion information are acquired and processed, and notification is made to a processing unit performing the second processing that the important phenomenon key event is acquisition-complete in a processing unit performing the first processing,
   a degree of importance corresponding to the important phenomenon is acquired for each important phenomenon key event, and
   in the second processing, events of an important event group including an important phenomenon key event having a degree of importance of a pre-set level are acquired and processed, and the pre-set level is raised if notification of completion is received from the processing unit performing the first processing.

2. The recording medium of claim 1, wherein:
   when events of an important event group have been acquired in the first processing, notification is made to the processing unit performing the second processing of a time difference to the current time from when the important phenomenon key event included in the acquired important event group was stored in the event storage unit; and in the second processing, the pre-set level is raised if the notified time difference is a predetermined threshold value or greater.

3. A data processing apparatus comprising:

a processor; and a memory storing instructions, which when executed by the processor perform a procedure, the procedure including:

acquiring a plurality of events that have issued in a management-target device and storing each of the plurality of acquired events in an event storage unit, acquiring specifying data that specify an important phenomenon key event from the plurality of events stored in the event storage unit;

acquiring events in sequence from a front position of the event storage unit, and performing first processing on the acquired events according to a processing condition;

performing second processing according to the processing condition on events of an important event group, the important event group including the important phenomenon key event and an event related to the important phenomenon key event, the second processing being performed concurrently with the first processing, via a different processing route from that of the first processing; and appending completion information to the acquired important phenomenon key event in the event storage unit, wherein in the first processing, if an event stored at the front position of the event storage unit is an important phenomenon key event not appended with completion information, events of an important event group including the important phenomenon key event not appended with the completion information are acquired and processed, and notification is made to a processing unit performing the second processing that the important phenomenon key event is acquisition-complete in a processing unit performing the first processing, a degree of importance corresponding to the important phenomenon is acquired for each important phenomenon key event, and in the second processing, events of an important event group including an important phenomenon key event having a degree of importance of a pre-set level are acquired and processed, and the pre-set level is raised if notification of completion is received from the processing unit performing the first processing.

4. The data processing apparatus of claim 3, wherein:

when events of an important event group have been acquired in the first processing, notification is made to the processing unit performing the second processing of a time difference to the current time from when the important phenomenon key event included in the acquired important event group was stored in the event storage unit; and in the second processing, the pre-set level is raised if the notified time difference is a predetermined threshold value or greater.

5. A data processing method comprising:

acquiring a plurality of events that have issued in a management-target device and storing each of the plurality of acquired events in an event storage unit, acquiring specifying data that specify an important phenomenon key event from the plurality of events stored in the event storage unit;

acquiring events in sequence from a front position of the event storage unit, and performing first processing on the acquired events according to a processing condition;

by a processor, performing second processing according to the processing condition on events of an important event group, the important event group including the important phenomenon key event and an event related to the important phenomenon key event, the second processing being performed concurrently with the first processing, via a different processing route from that of the first processing; and appending completion information to the acquired important phenomenon key event in the event storage unit, wherein in the first processing, if an event stored at the front position of the event storage unit is an important phenomenon key event not appended with completion information, events of an important event group including the important phenomenon key event not appended with the completion information are acquired and processed, and notification is made to a processing unit performing the second processing that the important phenomenon key event is acquisition-complete in a processing unit performing the first processing, a degree of importance corresponding to the important phenomenon is acquired for each important phenomenon key event, and in the second processing, events of an important event group including an important phenomenon key event having a degree of importance of a pre-set level are acquired and processed, and the pre-set level is raised if notification of completion is received from the processing unit performing the first processing.

6. The data processing method of claim 5, wherein:

when events of an important event group have been acquired in the first processing, notification is made to the processing unit performing the second processing of a time difference to the current time from when the important phenomenon key event included in the acquired important event group was stored in the event storage unit; and in the second processing, the pre-set level is raised if the notified time difference is a predetermined threshold value or greater.

7. A data processing system comprising:

a management-target device that collects together events that have issued in the management-target device itself, appends data indicating an important phenomenon key event to an important phenomenon key event, and transmits the collected events to a data processing apparatus; and the data processing apparatus including an acquisition unit that acquires a plurality of events that have issued in the management-target device, stores each of the plurality of acquired events in an event storage unit, and acquires specifying data that specify an important phenomenon key event from the plurality of events stored in the event storage unit;

a first processing unit that acquires events in sequence from a front position of the event storage unit, and performs first processing on the acquired events according to a processing condition; and a second processing unit that performs second processing according to the processing condition on events of an important event group, the important event group including the important phenomenon key event and an event related to the important phenomenon key event, and appends completion information to the acquired important phenomenon key event in the event storage unit, the second processing being performed concurrently with the first processing, via a different processing route from that of the first processing, wherein if an event stored at the front position of the event storage unit is an important phenomenon key event not appended with completion information, the first processing unit acquires and processes events of the important event croup including the important phenomenon key event not appended with the completion information, and notifies the second processing unit that the important phenomenon key event is acquisition-complete in the first processing unit, a degree of importance corresponding to the important phenomenon is acquired for each important phenomenon key event, and the second processing unit acquires and processes events of an important event group including an important phenomenon key event having a degree of importance of a pre-set level, and raises the pre-set level if notification of completion is received from the first processing unit.

8. The data processing system of claim 7, wherein:

when events of an important event group have been acquired, the first processing unit notifies the second processing unit of a time difference to the current time from when the important phenomenon key event included in the acquired important event group was stored in the event storage unit; and the second processing unit raises the pre-set level if the time difference notified from the first processing unit is a predetermined threshold value or greater.

\* \* \* \* \*